United States Patent Office 3,268,096
Patented August 23, 1966

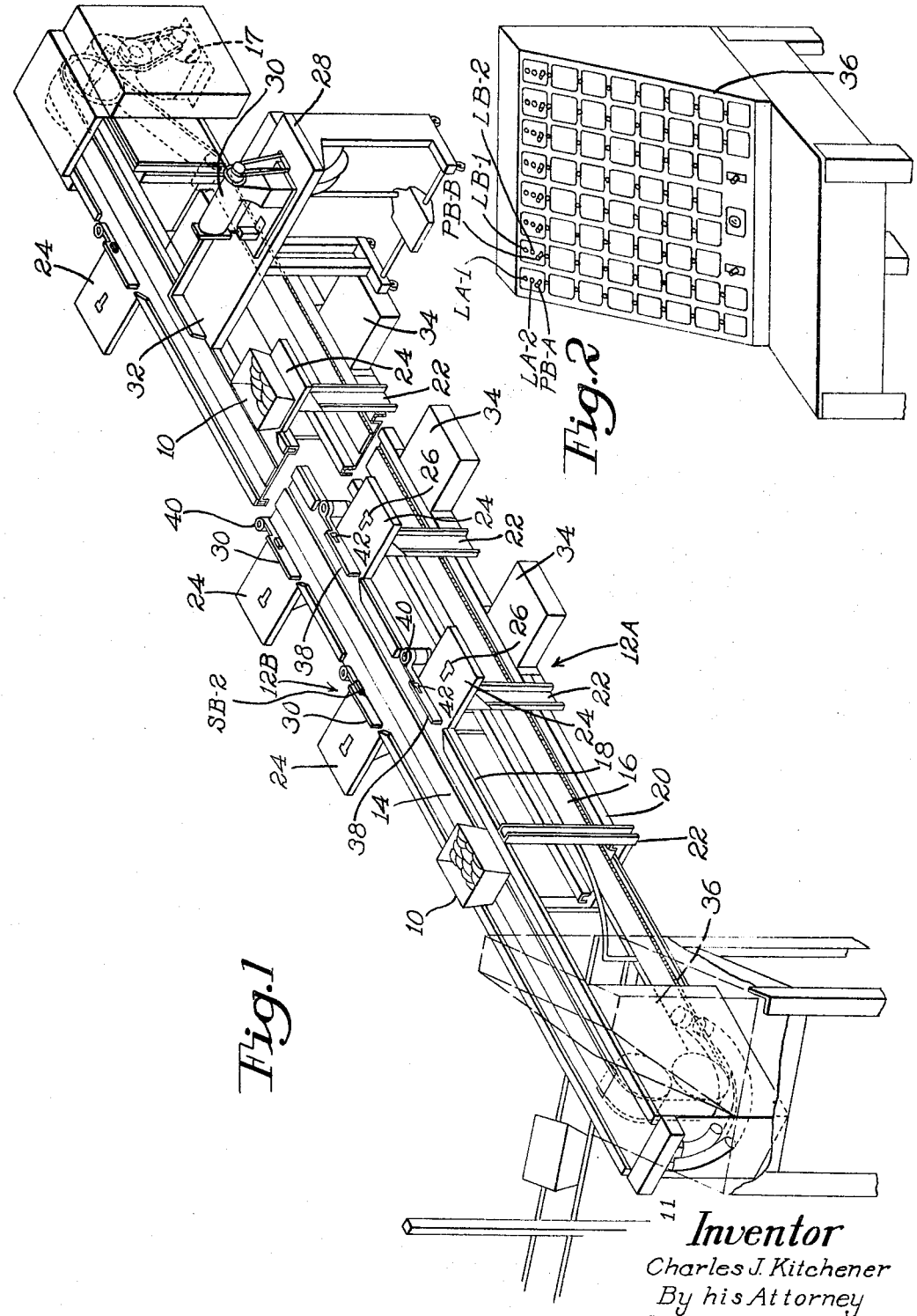

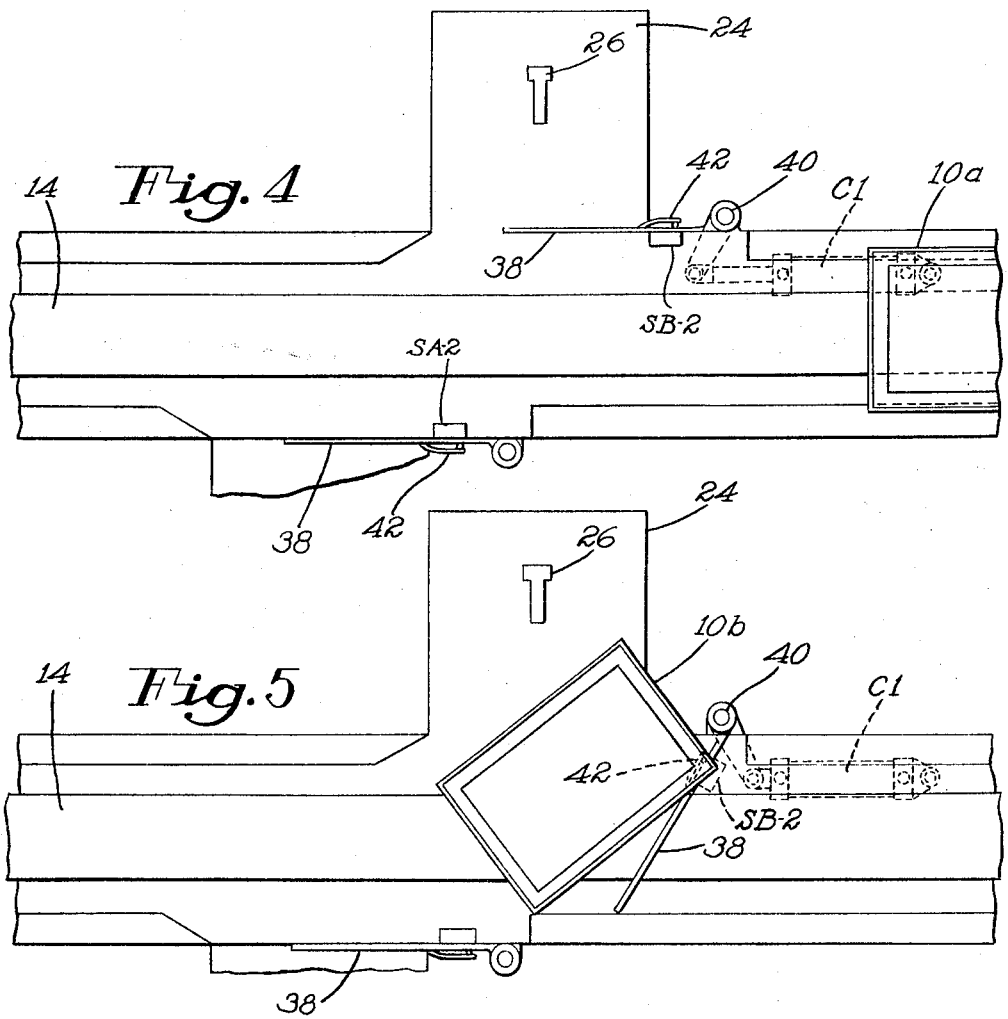
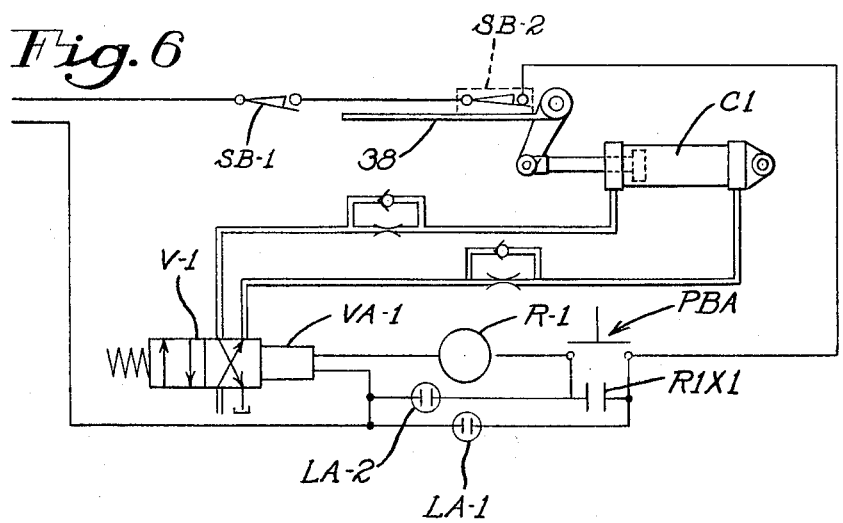

3,268,096
MANUALLY CONTROLLED SELECTIVE DELIVERY CONVEYOR SYSTEM
Charles J. Kitchener, Beverly, Mass., assignor to United Shoe Machinery Corporation, Flemington, N.J., a corporation of New Jersey
Filed Jan. 10, 1964, Ser. No. 337,042
5 Claims. (Cl. 214—11)

This invention relates generally to belt conveyor systems and has particular reference to a conveyor system of the type in which articles are dispatched from a storage station to various work stations disposed along the belt.

In certain types of manufacturing operations where a number of operations are to be performed on an article at different work stations by different operators, it has been found desirable to return the article to a central storage and dispatch station after completion of the operation at each work station, rather than send it directly to another work station for a subsequent operation. Such a procedure is particularly advantageous in situations where it is desired that the working procedure or order of operations be frequently varied, or where quality control requires frequent inspections of the work in process.

For this purpose it has been proposed to utilize a belt conveyor under the control of a dispatcher at a storage and control station at the head of the belt, the upper run of the belt being utilized to send the articles to the work station, and the lower run of the belt being utilized to return the articles to the storage station.

Several methods have been proposed for controlling the operation of this type of conveyor to insure that an article is dispatched to the desired work station, and to remove the article from the belt automatically when the article arrives at a position opposite the work station.

An object of this invention is to provide a belt conveyor system of the type described in which means is provided under the control of the operator for actuating means for diverting an article from the belt at the proper work station, and means is provided for automatically returning the diverting means to the original position.

A further object of this invention is to provide a belt conveyor system of the type described in which means is provided responsive to the arrival of a box at a work station to cause the diverting means at said station to move the box off the belt and return to its original position.

A further object of this invention is to provide a belt conveyor system of the type described having diverting means adapted to permit multiple feeding of boxes of work without collision between a box stopped for removal from the belt and a following box.

Other objects of the invention will be apparent to one skilled in the art from the following detailed description of a specific embodiment thereof.

In the drawings:

FIG. 1 is a perspective view of a conveyor system embodying the features of the invention;

FIG. 2 is a perspective view of a control panel for use with a conveyor system of the type described;

FIG. 4 is a top plan view of the portion of the conveyor system shown in FIG. 3 in which the diverting arm is disposed in the pass position;

FIG. 5 is a view similar to FIG. 4 in which the diverting arm is disposed across the belt in position to intercept a box traveling on the belt;

FIG. 6 is a schematic diagram of one form of control means for the conveyor system.

Figure 3:
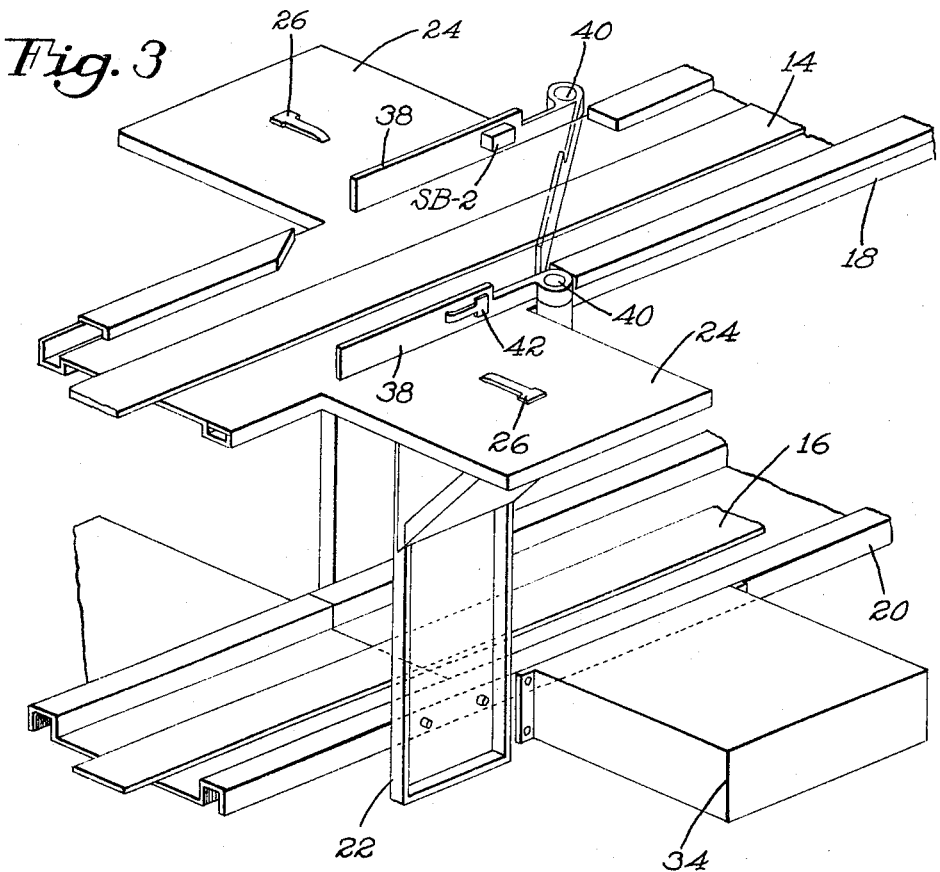
FIG. 3 is a perspective view of one of the work stations of the conveyor of FIG. 1.

Referring to the drawings, there is illustrated a belt conveyor system which is adapted to transfer articles, such as boxes 10a, 10b, etc. containing work in process, from a storage and dispatch station 11 to work stations 12a, 12b, etc. disposed alongside the conveyor. In the illustrated embodiment the conveyor comprises a belt having an upper run 14 for carrying boxes of work from the dispatch station to a position opposite any of the several work stations, and a lower run 16 for returning boxes of work to the dispatch station. The belt is driven by means of a suitable drive motor 17 in the usual manner.

The supporting structure for the runs of the belt comprises upper and lower members 18 and 20 supported by suitable legs 22. Disposed alongside the upper belt support 18 at each work station is a reserve box storage platform 24, positioned to receive a box diverted from the conveyor in a manner to appear hereinafter. Mounted in the surface of said platform 24 is a spring-loaded lever 26 which normally projects a small distance above said surface and is adapted to be depressed by the weight of a box resting on said surface. The lever 26 at each work station operates a switch (for example, switch SA–1 at station A; switch SB–1 at station B; etc.), which is of the normally closed type, but is held open when a box of work is present on the platform 24.

Also disposed at each work station is a work table 28 which extends generally at a right angle to the belt, with a work machine 30 such as a sewing machine or the like mounted on the table in spaced relation to the belt to leave a work surface 32 between the machine and the belt to receive a box of work. A return box platform 34 is disposed beneath the work table 28 at the same height as the lower run of the belt.

The operation of the conveyor is controlled by a dispatcher at the head of the conveyor by means of a control panel 36, which is provided with indicating and control means for each work station. For example, for work station A, signal lights LA–1, LA–2 and a push button PB–A are provided; for work station B, signal lights LB–1, LB–2 and a push button PB–B are provided, etc.

Disposed at each work station is a diverting arm 38 mounted on a pivot shaft 40, with said arm being movable between a first or pass position in which the diverting arm is disposed parallel to the belt (see FIGS. 3 and 4) and a second or stop position in which the arm extends diagonally across the belt in an upstream direction (see FIG. 5). The diverting arm is movable between these two positions by the piston of a pneumatic cylinder C–1 in a manner to appear hereinafter. Mounted on each arm near the proximal end is a normally closed microswitch (SA–2, SB–2, etc.) having an operating lever 42 projecting from the upstream surface of the lever. The switches SA–2, SB–2, etc. are adapted to be opened by contact with a box of work arriving at the diverting arm, for a purpose to appear hereinafter.

The descriptions to follow of the control circuits and operation will refer to station B, with the understanding that the operation and control circuits for the other stations are similar.

Referring to FIG. 6, there is illustrated a first form of circuit for controlling the operation of the conveyor. As illustrated therein, the reserve box platform switch SB–1 is connected in series with the diverting arm switch SB–2, and these two switches are also connected in series with signal light LB–1, so that when both switches are closed, signal light LB–1 is energized, thereby indicating that the operator at station B does not have a box of work present on the reserve box platform. The switches SB–1 and SB–

2 are also in series with the dispatchers push button switch PB–B, so that when both SB–1 and SB–2 are closed the push button PB–B is energized.

During operation of a conveyor of the type illustrated by means of the control circuit of FIG. 6, the belt normally runs continuously. When the dispatcher at the control panel observes that a signal light, for example LB–1 is lit, she places a box of work on the conveyor belt and depresses push button PB–B on the control panel. A circuit is thereby completed through a relay R1 to actuate a solenoid VA–1 controlling pneumatic valve V–1. The energization of relay R–1 closes contacts R1X1 to complete a holding circuit so that the circuit to the actuator is maintained until switch SB–2 is subsequently opened, as will appear hereinafter. The closing of switch PB–B also completes a circuit to the signal light LB–2 on the control panel to indicate to the operator that a box has been dispatched to station B. The energization of actuator VA–1 causes valve V–1 to shift so as to admit pressure fluid to the appropriate end of the cylinder C–1 to cause the piston therein to swing the diverting arm so as to extend diagonally across the belt to the stop position previously described (see FIG. 5).

When the box of work arrives at the diverting arm, a forward corner thereof strikes the arm, whereby the continued movement of the belt on which the box is supported causes the box to pivot so that said corner slides along the arm to contact the switch lever 42. Switch SB–2 is thereby opened, breaking the circuit to the relay R–1 and the valve actuator VA–1, so that the valve V–1 returns to the original position. Pressure fluid is thereby supplied to the opposite end of the cylinder, causing the diverting arm to swing back to its original position parallel to the belt, and in doing so pushes the box of work off the belt into the reserve box platform. The opening of switch SB–2 also extinguishes the signal lights on the control panel, thereby indicating to the dispatcher that the box has arrived. As the box slides onto the reserve box platform, actuates the lever 26 to open switch SB–1, thereby rendering it impossible for the dispatcher to inadvertently send another box of work to the station.

In some types of manufacturing operations, where the turnover of work is rapid, it is desirable that the system be adapted to multiple feeding of boxes, that is, provision must be made for feeding a second box before a first box has arrive at its destination.

If such multiple feeding is attempted with a conveyor having the control circuitry of FIG. 6, a second box could possibly collide with a first box stopped at a diverting arm before said first box was removed from the conveyor belt by the arm.

For such purpose, a control circuit may be provided in which the contact of the box with the switch on the diverting arm stops the belt, in addition to actuating the diverting arm, with means being provided to automatically restart the belt when the box is slid onto the reserve box platform.

Figure 7:
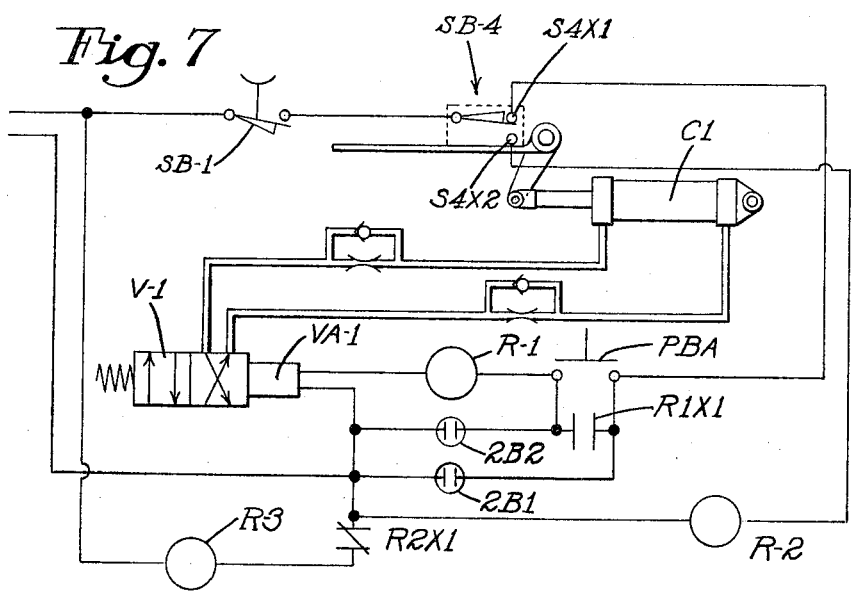
FIG. 7 is a schematic diagram of an alternate form of control means.

A circuit for such purpose is illustrated in FIG. 7, which is similar to the circuit of FIG. 6 with the following differences. The diverting arm switch, which in this embodiment is designated SB–4, is a single pole double throw switch, having a contact arm which can complete a circuit to either of two contacts S4X1 or S4X2.

The contact arm of the switch SB–4 normally completes a circuit to contact S4X1, and is shifted to contact S4X2 when the switch lever 42 is actuated by contact with a box in the manner previously described.

As in the previous embodiment the reserve box platform switch SB–1 is connected in series with switch SB–4. Contact S4X1 of switch SB–4 is connected to the dispatcher's push button PB–B and the signal light LB–1. The circuit through the push button PB–B is continued through relay R–1 and valve actuator VA–1.

The other contact S4X2 of the diverting arm switch is connected to a relay R–2, which controls contacts R2X1 in the circuit to a starting control relay R–3 of the belt drive motor 17.

The operation of the conveyor with the circuit of FIG. 7 is as follows: When the operator at station B, for example, removes the box of work from the reserve box platform and places it on her work table, switch SB–1 is closed, thereby energizing (through switch SB–4) signal light LB–1 on the control panel. When the dispatcher places a box of work on the belt and presses push button PB–B, the valve actuator VA–1 is energized in the manner previously described to cause the diverting arm 40 at station A to extend across the belt. When the box of work dispatched to the station in response to the signal arrives at the diverting arm and contacts the lever of switch SB–4, the contact arm of the switch is transferred from contact S4X1 to contact S4X2, which (1) energizes relay R–2 to open contact R2X1 thereby breaking the circuit to the starting control relay R–3 of the belt drive motor to stop the motor and the belt, and (2) breaks the holding circuit to the relay R–1 and the valve actuator VA–1 so that the valve V–1 is shifted to admit pressure fluid to the opposite end of the diverting arm cylinder C–1 to cause the arm to move the box off the belt onto the reserve box platform.

When the box is pushed onto the lever 26 in the reserve box platform, switch SB–1 is opened, breaking the circuit to the relay R–2, thereby closing contacts R2X1 to re-energize the motor starting control relay R–3 to start the belt.

As in the previous embodiment, the presence of the box of work on the reserve box platform, by holding switch SB–1 open, makes it impossible for the dispatcher to inadvertently send another box of work to the station.

One of the advantages of the illustrated embodiment of the invention results from the positioning of the diverting arm switches (SA–1, SB–1, etc.) near the proximal end of the arm. Such positioning permits a box of work, on contact with the arm, to pivot to an orientation nearly parallel to the arm, before the arm switch is operated, which facilitates the operation of the arm in removing the box from the belt.

Since certain obvious changes may be made in the illustrated embodiments of the invention without departing from the scope thereof, it is intended that all matter contained herein be interpreted in an illustrative and not in a limiting sense.

Having thus described my invention, what I claim as new and desired to secure by Letters Patent of the United States is:

1. A conveyor system, comprising a conveyor belt, a series of work stations disposed alongside the conveyor belt, each work station having an article storage platform, a switch mechanism associated with each platform adapted to be actuated by an article resting on the platform, a diverting arm at each station, each of said arms being movable between a diverting and a non-diverting position, signal means energized by the switch mechanism during the absence of an article on a platform, means controllable by a dispatcher at the head of the conveyor to move the diverting arm to the diverting position, means responsive to the arrival of a dispatched article at the work station to cause said diverting arm to return to the non-diverting position and to actuate said switch mechanism to de-energize the signal means.

2. A conveyor system, comprising a conveyor belt, a series of work stations disposed alongside the conveyor belt, each work station having an article storage platform, a switch mechanism associated with each platform adapted to be actuated by an article resting on the platform, a diverting arm at each station, each of said arms being movable between a diverting and a non-diverting position, signal means energized by the switch mechanism during the absence of an article on a platform, means controllable by a dispatcher at the head of the conveyor to move the diverting arm to the diverting position, means responsive to the arrival of a dispatched article at the diverting arm to cause said diverting arm to return to the non-diverting position and push said article onto the storage platform and thereby actuate said switch mechanism to de-energize the signal means.

3. A conveyor system, comprising conveying means, a series of work stations disposed along the conveying means, each having an article storage platform, means at each work station movable into a position to intercept articles being conveyed, means responsive to such interception to stop the conveying means and move the article off the conveying means onto the article storage platform, means responsive to the arrival of the article on the article storage platform to restart the conveying means.

4. A conveyor system, comprising conveying means, a series of work stations disposed alongside the conveying means, each station having an article storage platform, switch means associated with said platform and adapted to be actuated by an article resting on the platform, means at each work station movable into a position to intercept articles being conveyed, means responsive to such interception to stop the conveying means and move the article off the conveying means onto the storage platform so that said switch means is actuated, and means responsive to the actuation of said switch means to restart the conveyor.

5. A conveyor system, comprising a conveyor belt, a series of work stations disposed alongside the conveyor belt, each work station having an article storage platform, a switch mechanism associated with each platform adapted to be actuated by an article resting on the platform, a diverting arm at each station, each of the arms being movable between a diverting and a non-diverting position, means to energize signal means at a dispatch station at the head of the conveyor to indicate the absence of an article on the storage platform, means controllable by a dispatcher at the head of the conveyor to move the diverting arm to the diverting position, means responsive to the arrival of a dispatched article at the work station to cause said diverting arm to return to the non-diverting position and to actuate said switch mechanism, and means responsive to said actuation of said switch mechanism to deenergize the signal means.

References Cited by the Examiner
UNITED STATES PATENTS

| | | | |
|---|---|---|---|
| 630,453 | 8/1899 | Fairbanks | 198—188 X |
| 1,881,895 | 10/1932 | Olson | 198—21 |

EVON C. BLUNK, *Primary Examiner.*

WILLIAM B. LA BORDE, *Examiner.*